March 30, 1965 S. FISHER ETAL 3,176,254
SEAM-WELDING WHEEL BEARING
Filed Jan. 25, 1962
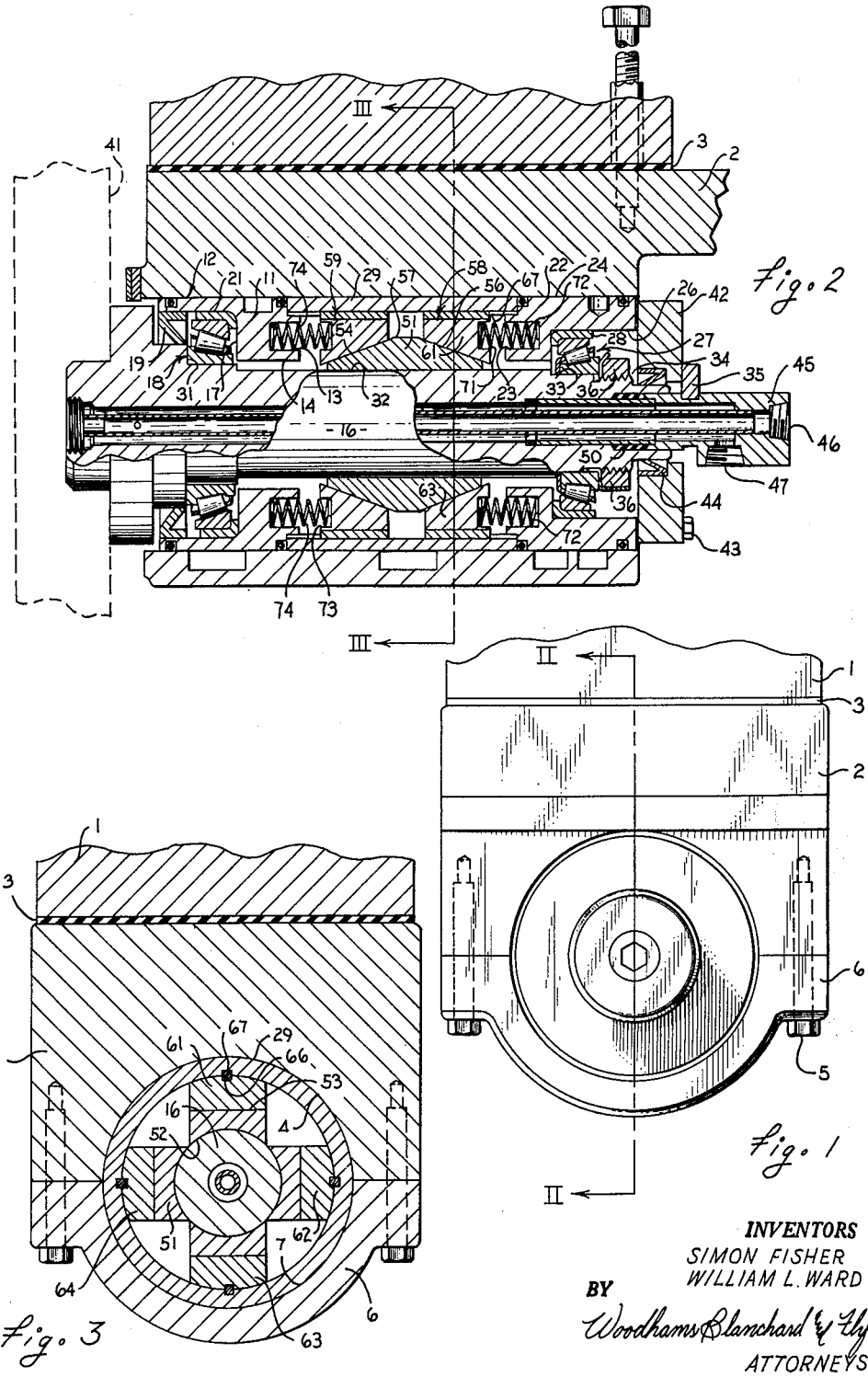
INVENTORS
SIMON FISHER
WILLIAM L. WARD
BY
Woodhams Blanchard & Flynn
ATTORNEYS

United States Patent Office 3,176,254
Patented Mar. 30, 1965

3,176,254
SEAM-WELDING WHEEL BEARING
Simon Fisher, Bay City, and William L. Ward, Essexville, Mich., assignors to National Electric Welding Machines Co., Bay City, Mich., a corporation of Michigan
Filed Jan. 25, 1962, Ser. No. 168,665
8 Claims. (Cl. 339—5)

This invention relates to electrical apparatus and it relates particularly to apparatus primarily adapted for resistance welder use for transferring heavy current loads from a stationary member to a rotating member.

In the design of electrical welding machinery, such as resistance welders, there are many instances where electric current, often of the order of thousands or tens of thousands of amperes, is to be transferred from a fixed member to a relatively rotating member. An example is the supplying of welding current to the rotating electrode of a seam welder. This is an old problem and has been the subject of a great deal of effort in the past. The basic problem involved has been that of transmitting to a rotating electrode these relatively high welding currents with a minimum of power loss while at the same time minimizing heat generation, arcing and wear. A further problem lies in the fact that the materials which have high conductivity and therefore should be used in current conducting means practically never have good wear characteristics and hence current transfer means involving sliding or rubbing contacts must be made from relatively soft materials which will need frequent replacement.

Various means have been devised in the past to meet these problems, of which some of the best have been various types of conductor sleeve bearings or combinations of friction bearings and sleeve contact devices. None of these attempts to date has been satisfactory inasmuch as they still involve arcing, which causes pitting between the contact devices and the surface to be contacted as well as mechanical wear upon the conductors or contact devices. Further, sleeve and bearing contact devices themselves involve a problem in that heavy currents develop substantial heat in the parts which causes them to expand substantially. Hence, they have often in the past been designed to run initially rather loose in the contactor sleeve and/or bearings. This further promotes arcing and pitting and has not been satisfactorily corrected by attempts to design these parts within closer tolerances and hold them within such dimensions by cooling.

For this reason the more successful devices have been those permitting a certain amount of radial movement on the part of the shaft contacting elements and several attempts have been made in this direction. One widely used and well-known type of such last-named equipment has utilized thin laminated or multi-strand flexible connectors connecting the fixed member to a shoe riding on the surface of the rotary member. This permits satisfactory radial movement of the contacting parts but has not been entirely satisfactory due to limited life of the flexible connectors for a variety of well understood reasons. Another attempt has been to provide shoes riding on the movable surface and bearing slidingly against a fixed surface which latter is in turn mounted on the fixed member. One highly satisfactory example of this latter approach is in the patent to Fisher and Kurlinski, Patent No. 2,730,600 wherein current transferring shoes, and wedges slidingly backing said shoes, are arranged for movement transversely with respect to the axis of the rotating shaft.

Many of the problems attendant upon the use of flexible conductors as above mentioned are avoided by the use of sliding-contact devices, such as that set forth in Patent No. 2,730,600 above mentioned, but there are other conditions to be met by apparatus of this type which the device of Patent No. 2,730,600 does not fully meet. Among these problems is the desirability of further simplifying the apparatus to minimize the number of parts required, to simplify the shapes of the parts required and to arrange said parts in a manner better adaptable for use in cartridge form. With particular respect to this latter mentioned feature, it will be recognized that the welding machines, with which the equipment here in question is used, are large and expensive machines and are often used in assembly line situations such that down time on such a machine is an extremely expensive matter. Continuing to refer to seam welders to illustrate the problem and one particularly advantageous use of the invention, it will be recognized that the high electrical currents involved frequently result in relatively short life for the current-transfer means and the often substantial radial loads placed upon the rotating electrode require at least occasional replacement of the bearings supporting same. When any of these replacements are required, the machine is necessarily shut down. Thus, if both the bearings and the electrical transfer means could be arranged into a cartridge for more rapid replacement as needed, the down time could be reduced appreciably with resultant savings in the operation of the welding equipment.

Accordingly, the objects of the invention include:

(1) To provide means for efficiently transferring large electrical currents from a fixed device to a relatively rotating device;

(2) To provide apparatus, as aforesaid, which will be particularly adaptable to the rotating electrode of an electrical resistance seam-welding machine;

(3) To provide apparatus, as aforesaid, which will provide large contact areas between the fixed means and the relatively moving means;

(4) To provide apparatus, as aforesaid, wherein motion between the parts will be confined to relative sliding motion between said relatively large contact areas whereby arcing and the resultant deterioration of said contact surfaces will be minimized.

(5) To provide apparatus, as aforesaid, which will be well adapted for arranging as a cartridge construction, whereby replacement of the parts as needed can be carried out quickly and efficiently;

(6) To provide apparatus, as aforesaid, which will minimize the size of housing required for containing the current-transfer means and thereby maximize the space available for passing welding work through the welding zone of the machine.

(7) To provide wear-compensating means which will keep the wearing parts within acceptable tolerances during the normal life of the apparatus.

(8) To provide apparatus, as aforesaid, which is readily adaptable for use with liquid-cooled shafts associated with the rotating electrode of a seam welder.

Other objects and purposes of the invention will be apparent to persons acquainted with devices of this general type upon reading the following disclosures and inspection of the accompanying drawings.

Referring now to the drawings:

FIGURE 1 is an end view of the apparatus with the rotating electrode removed and viewed from the end of the shaft occupied by said rotating electrode.

FIGURE 2 is a section taken on the line II—II of FIGURE 1.

FIGURE 3 is a section taken on the line III—III of FIGURE 2.

Referring now to the drawings, the invention is shown in connection with the rotating electrode of a seam welder. However, it will be recognized that this choice of a seam welder is solely for illustrative purposes and constitutes no limitation. Instead, the invention is equally applicable to a wide variety of other specific uses wherein large amounts of current are to be transferred between parts wherein one part is rotatable relative to the other part.

The welding machine is provided with a suitable bearing supporting frame member 1 to which is mounted (by suitably insulated means, such as bolts) a bearing plate 2. Insulation 3 is provided for electrically insulating the plate 2 and parts fastened thereto from the machine frame 1. Electrical current is supplied to the plate 2. The lower side of said plate 2 has a semi-cylindrical recess 4 therein for receiving the hereinafter-mentioned parts and has fastened thereto by bolts 5 a closure cap 6 having therein a further semi-cylindrical recess 7 matching the recess 4 for defining the bearing and contact means hereinafter further described.

Located within the cylindrical zone defined by the recesses 4 and 7 is an inner end member 11, having an outer cylindrical surface 12 fitting snugly against the surfaces defined by the recesses 4 and 7. A plurality of end recesses 13 is provided at the inner end of said part 11 for the reception of the hereinafter mentioned springs and a central opening 14 provides passageway for the shaft 16. An end recess 17 provides space for the bearings 18 located between said shaft 16 and the inner end member 11 together with a seal 19 if desired. Insulation 21 is provided for electrically isolating the bearing 18 from electrical energy which may appear in the said inner member 11.

An outer end member 22 is made substantially similar to the member 11. It has a plurality of end recesses 23 for receiving a further plurality of springs hereinafter mentioned, a peripheral outer surface 24 for engaging the walls of the recesses 4 and 7 and an outer end recess 26 for receiving the bearing 27. Insulation 28 electrically isolates the bearing 27 from electrical current appearing within the outer end member 22. A sleeve-like spacer 29 is provided for establishing the proper spacing between the end members 11 and 22. The shaft 16 is provided with suitable means such as the shouldered zone 31 for receiving the bearing 18, a smooth and well polished peripheral zone 32 for making contact with the hereinafter-mentioned current-transferring shoes, a further shouldered recess 33 for receiving the bearing 27 and a threaded zone 34 for receiving a fastening nut 36. A rotatable welding electrode 41 may be affixed to the left end of the shaft 16 in any conventional manner and a plate 42 closes the rightward end of the recess 26. Said plate 42 may be held against the outer end of the end closure 22 by any convenient means such as by bolts of which one appears at 43. Said plate 42 is provided with a recess for receiving the sealing means 44 acting against the shaft 16 in the usual manner. A non-rotating fitting 45 is provided with conventional connections 46 and 47 for the entrance and exiting of cooling liquid and said fitting 45 is telescopically related to the shaft 16 as convenient and sealed by packing 50.

Arranged around the periphery of the shaft 16 and intermediate the end members 11 and 22 are a plurality, here four, of contact members or shoes 51, each thereof being identical with all of the others. Each of said pieces has a radially inner surface 52 which is concave and of a radius to fit snugly against the outer surface of the shaft 16. Each of said pieces 51 has a radially outer surface 53 which in transverse cross section is flat as shown in FIGURE 3. Said outer surface, however, in longitudinal section has tapered ends 54 and 56 and in this embodiment has a midsection 57 which is parallel to the axis of the said shaft. Two sets of wedges, 58 and 59, are located between the four shoes 51 and the sleeve-like spacer 29. One set 58 of said wedges is comprised of four wedges 61, 62, 63 and 64, each thereof having radially inner surface conforming to, and snugly contacting, the radially outer surface 53 of the shoes 51 and a radially outer surface conforming to, and snugly contacting, the radially inner surface of the said sleeve 29. Preferably, each of said wedges is provided with a key 66 running in an appropriate keyway 67 in the inner surface of the sleeve 29. Thus, the wedges are held against circumferential movement with respect to said sleeve while permitting axial movement with respect thereto.

Each of said wedges 61, 62, 63 and 64 has a recess 71 or its rightward (as appearing in FIGURE 2) end for the reception therein of the leftward end of a spring 72. The rightward end of said spring is received in the recess 23 of the outer end member 22. Thus, said springs 72 keep a constant leftward, or inward, pressure on the wedges 58 urging same against the adjacent tapered surfaces 56 of the contact shoes 51.

A similar group of wedges 59 is provided adjacent and in contact with the tapered surface 54 of the contact shoes 51. Said wedges 59 are similarly anchored by keys to the keyway 67 in the leftward side of the sleeve 29. Said wedges 59 are also provided with recesses 73 in which are received the rightward end of springs 74 whose leftward ends are received in the recesses 13 whereby said springs bear against the inner end member 11 and urge the wedges 59 rightwardly against the tapered surface 54 of the contact shoes 51.

It will be seen that the end members 11 and 22 together with the sleeve 29 arranged therebetween constitute somewhat of a cartridge which can be assembled upon the shaft and pushed into place without disassembly of the apparatus other than loosening of the bolts 5 holding the closure cap 6, removal of the plate 42 with its associated parts, and removal of the bearing 27. It will be recognized that either or both of the bearings 18 and 27 may be a part of said cartridge and included therewithin or they may be installed and removed separately therefrom. Therefore, it can be seen that all bearing and contacting parts and the shaft enclosed by closure cap 6 and connector 2 may be removed as a unit by removing the bolts 5 and closure cap 6. As a further alternative the entire unit including the connector 2, all of the bearing and contacting parts, and the shaft, may be easily and quickly removed from the frame 1 as a unit for repair or replacement.

Further, the parts have a minimum radial extent so that they require only a small radial distance around the shaft for receiving same. They are all relatively easy to manufacture, many of the parts are interchangeable with each other, the assembly is self-compensating as the contact shoes 51 wear, and all of the contacting surfaces through which electrical current is expected to travel, including the surfaces between the shoes 51 and the shaft, are of wide extent and capable of contacting intimately with respect to each other. Further, all of the surfaces through which current is expected to pass, excepting the surfaces between the parts 51 and the shaft, move only imperceptibly with respect to each other and hence no arcing will occur between such parts.

While a particular preferred embodiment of the invention has been described above, the invention contemplates such changes or modifications therein as lie within the scope of the appended claims.

What is claimed is:

1. In a resistance-welding machine having a current-conducting frame member and a shaft rotatable with respect to said frame member, means for conducting electric current from said frame member to said shaft comprising in combination:

a plurality of independent contact shoes arranged circumferentially around and in contact with circumferentially spaced zones on said shaft, the external surface of each of said shoes being tapered at opposite axial ends thereof the internal surface of each of said shoes being partially circular in cross section;

a plurality of wedges arranged around each axial end of said shoes, there being one wedge in contact with each tapered end of each shoe;

guide means holding said wedges against radial outward movement but permitting axial movement of each thereof;

resilient means constantly urging wedges toward each other;

whereby an electrical path interrupted only by a relatively wide contacting surface is provided between said frame and said shaft.

2. The device defined in claim 1 including a pair of end members arranged adjacent opposite respective ends of said guide means and wherein said resilient means are arranged respectively between said end members and adjacent wedges.

3. In an electrical resistance-welding machine having a supporting arm and a shaft rotatable with respect thereto, transfer means for conducting electric current from said arm to said shaft, comprising in combination:

a plurality of contact shoes arranged circumferentially around said shaft and in close contact with the external surface of said shaft, each of said contact shoes being tapered in an axial direction at opposite axial ends thereof;

a plurality of wedges surrounding each tapered portion of said contact shoes, one wedge engaging each end of each shoe;

a sleeve externally surrounding and contacting said wedges, including guide means preventing circumferential movement of said wedges with respect to said sleeve but permitting axial movement therebetween said wedges preventing circumferential movement of said shoes with respect to said arm;

a pair of end members positioned at opposite axial ends of said sleeve, each of said end members having a plurality of recesses in the faces thereof opposed to a set of said wedges, and springs positioned within said recesses bearing against said wedges for urging said wedges toward the axial center of said contact shoes;

means holding said end members and sleeve as a unit against said arm whereby selected operating parts of said transfer means may be readily applied to or removed from said assembly as required for both original installation or maintenance purposes.

4. The device defined in claim 3 including also recesses at the respectively oppositely facing ends of the end members and bearings within said recesses for supporting said shaft.

5. In an electrical resistance-welding machine having a supporting arm and a shaft rotatable with respect thereto, transfer means for conducting electric current from said arm to said shaft, comprising in combination:

a plurality of axially elongated contact shoes arranged circumferentially around said shaft and in close contact with the external surface of said shaft, each of said contact shoes being tapered in an axial direction at opposite axial ends thereof;

a plurality of axially elongated wedges surrounding each tapered portion of said contact shoes, one wedge engaging each end of each shoe;

a sleeve externally surrounding and contacting said wedges, including key and keyway means preventing circumferentially movement of said wedges with respect to said sleeve but permitting axial movement therebetween;

a pair of end members positioned at opposite axial ends of said sleeve, each of said end members having a plurality of recesses in the faces thereof opposed to a set of said wedges and coil springs positioned within said recesses bearing against said wedges for urging said wedges toward each other and toward the axial center of said contact shoes;

means holding said end members and sleeve as a unit against said arm whereby selected operating parts of said transfer means may be readily applied to or removed from said assembly as required for both original installation or maintenance purposes.

6. In a resistance-welding machine having a current-conducting frame member and a shaft rotatable with respect to said frame member, means for conducting electric current from said frame member to said shaft, comprising in combination:

a spaced pair of end members fixed with respect to said frame member;

a bearing supported at the axially outer end of each of said end members for rotatably supporting said shaft;

contact shoe means mounted on said shaft, the internal surface of said contact shoe means being in contact with the external surface of said shaft over a large area, said shoe means having external surfaces tapering axially toward the opposite axial ends thereof;

wedge means surrounding and engaging the respective tapered surfaces of said contact shoe means; and pressure-applying means received between the axially inner end of each of said end members and the adjacent wedge means for urging said wedge means toward each other and into snug contact with said tapered surfaces.

7. In a resistance-welding machine having a current-conducting frame member and a shaft rotatable with respect to said frame member, means for conducting electric current from said frame member to said shaft, comprising in combination:

a contact shoe arranged in contact with said shaft, said shoe having two axially spaced, axially extending surfaces inclined in opposite directions with respect to the axis of said shaft;

a wedge bearing on each of said inclined surfaces, said wedges being independent of each other and being oppositely inclined for surface-to-surface engagement with said inclined surfaces on said shoe;

guide means holding said wedges against radially outward movement but permitting axial movement of each thereof;

resilient means constantly urging said wedges in opposite axial directions against said inclined surfaces on said shoe;

whereby an electrical path interrupted only by a relatively wide contacting surface is provided between said arm and said shaft.

8. In an electrical resistance-welding machine having a supporting arm and a shaft rotatable with respect thereto, transfer means for conducting electric current from said arm to said shaft, comprising in combination:

a plurality of independent, axially elongated, contact shoes spaced circumferentially around said shaft, each of said contact shoes having a radially inner face which is partially circular in cross section for closely contacting the external surface of said shaft and having two radially outer, axially extending, planar surfaces inclined in opposite directions toward the axis of said shaft;

a pair of sets of axially elongated, circumferentially spaced, independent wedges, the sets of wedges being axially spaced and each having a planar radially inner face, the inner faces of the wedges of each set being similarly inclined with respect to the axis of the shaft and said inner faces of the wedges of the respective sets being inclined in opposite axial directions, each of said surfaces on said shoes having the face of one of said wedges bearing thereon;

a sleeve externally surrounding and contacting said wedges;

key and keyway means preventing circumferential movement of said wedges with respect to said sleeve but permitting axial movement of said wedges, said wedges preventing circumferential movement of said shoes with respect to said arm;

a pair of spaced end members positioned at opposite axial ends of said sleeve, each of said end members having a plurality of recesses in the faces thereof opposed to one of said sets of wedges and coil springs positioned within said recesses bearing against said wedges for urging said wedges toward each other and toward the axial center of said contact shoes;

a bearing mounted on the axially outer end of each of said end members for rotatably supporting said shaft; and means holding said end members and sleeve as a unit against said arm whereby selected operating parts of said transfer means may be readily applied to or removed from said assembly as required for both original installation or maintenance purposes.

References Cited by the Examiner
UNITED STATES PATENTS 2,625,639  1/53  Mallett et al.
2,730,600  1/56  Fisher et al.

FOREIGN PATENTS 188,772  4/56  Austria.

JOSEPH D. SEERS, *Primary Examiner*.